United States Patent
Tsou et al.

(10) Patent No.: US 9,840,597 B2
(45) Date of Patent: Dec. 12, 2017

(54) POLYAMIDE-POLYOLEFIN COPOLYMERS AND METHODS OF MAKING THEM

(71) Applicant: ExxonMobil Chemical Patents Inc., Baytown, TX (US)

(72) Inventors: Andy H. Tsou, Houston, TX (US); Yong Yang, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/900,332

(22) PCT Filed: Jul. 15, 2014

(86) PCT No.: PCT/US2014/046676
§ 371 (c)(1),
(2) Date: Dec. 21, 2015

(87) PCT Pub. No.: WO2015/023380
PCT Pub. Date: Feb. 19, 2015

(65) Prior Publication Data
US 2016/0152777 A1     Jun. 2, 2016

Related U.S. Application Data

(60) Provisional application No. 61/866,702, filed on Aug. 16, 2013, provisional application No. 61/907,463, filed on Nov. 22, 2013.

(51) Int. Cl.
| | | |
|---|---|---|
| C08G 65/38 | (2006.01) | |
| C08G 81/02 | (2006.01) | |
| C08G 69/48 | (2006.01) | |

(52) U.S. Cl.
CPC ........... C08G 81/028 (2013.01); C08G 65/38 (2013.01); C08G 69/48 (2013.01); C08G 81/025 (2013.01)

(58) Field of Classification Search
CPC .................................................. C08G 81/028
See application file for complete search history.

(56) References Cited

U.S. PATENT DOCUMENTS

| | | | | |
|---|---|---|---|---|
| 2,910,459 | A * | 10/1959 | Rothrock | C08F 220/32 260/DIG. 17 |
| 3,285,949 | A * | 11/1966 | Siebert | C08F 36/04 528/84 |
| 5,342,895 | A * | 8/1994 | Tagami | C08G 81/028 525/183 |
| 6,306,963 | B1 * | 10/2001 | Lane | C08F 290/061 525/242 |
| 6,740,698 | B2 * | 5/2004 | Akkapeddi | B65D 81/267 524/394 |
| 7,022,765 | B2 | 4/2006 | Adedeji et al. | |
| 9,695,288 | B2 | 7/2017 | Yang et al. | |
| 9,708,435 | B2 | 7/2017 | Blok et al. | |
| 2002/0197415 | A1 * | 12/2002 | Bravo Vasquez | C23C 18/14 427/552 |
| 2003/0088027 | A1 * | 5/2003 | Chin | C08L 67/02 525/132 |
| 2011/0152471 | A1 | 6/2011 | Kamalakaran et al. | |
| 2014/0087983 | A1 * | 3/2014 | Patil | C10M 149/16 508/304 |
| 2014/0336324 | A1 * | 11/2014 | Tsou | C08K 9/06 524/413 |
| 2016/0311949 | A1 * | 10/2016 | Haberkorn | B32B 27/08 |

FOREIGN PATENT DOCUMENTS

| | | |
|---|---|---|
| JP | 2615925 | 4/1990 |
| KR | 10-0612635 | 3/2003 |
| WO | 2012/080404 | 6/2012 |

OTHER PUBLICATIONS

U.S. Appl. No. 61/907,463, filed Nov. 22, 2013, Yang.

* cited by examiner

*Primary Examiner* — Margaret Moore
(74) *Attorney, Agent, or Firm* — Kevin M. Faulkner

(57) ABSTRACT

A process for forming a polyamide-polyolefin copolymer comprising combining a vinyl or vinylidene terminated polyolefin with a linker to form a polyolefin-linker composition; combining the polyolefin-linker composition with a polyamide to form a polyamide-polyolefin copolymer. The linker can be a glycidyl-siloxane compound or a poly (arylene ether) copolymer.

19 Claims, 2 Drawing Sheets

POLYAMIDE-POLYOLEFIN COPOLYMERS AND METHODS OF MAKING THEM

PRIORITY CLAIM TO RELATED APPLICATIONS

The present Application is a National Stage Application of International Application No. PCT/US2014/046676, filed Jul. 15, 2014, which is related to "Stabilized Poly(Arylene Ether) Compositions and Methods of Making Them," filed concurrently herewith, and claims priority to U.S. Ser. No. 61/866,702 filed on Aug. 16, 2013, and U.S. Ser. No. 61/907,463 filed Nov. 22, 2013, all of which are incorporated by reference.

FIELD OF THE INVENTION

The present invention(s) relate to polyamide-polyolefin copolymers and a method of forming such copolymers.

BACKGROUND

The inventors disclosed earlier in U.S. Ser. No. 61/907,463 filed Nov. 22, 2013, a new type of copolymer, namely poly(phenylene ether) and polyolefin copolymer. However, the composition and method disclosed in that application can hardly be applied with polyamide, which represents a much bigger Engineering Thermoplastic (ETP) market. Polyolefin and polyamide are immiscible and difficult to be compatibilized. A polyolefin-polyamide copolymer or well compatibilized polyolefin-polyamide blend can provide both good properties and processability, combining the advantages derived from either polyolefin or polyamide.

A common method in the prior art is to utilize maleated polyolefins and react the amine chain end of polyamides with the anhydride functional groups along the polyolefin chains, to produce graft copolymers. The composition, structure and morphology of the graft copolymers made by this method are often poorly defined, resulting in compromised properties. We disclose here an improved means of coupling common polyamides such as Nylon with a polyolefin.

SUMMARY

Disclosed herein is a process for forming a polyamide-polyolefin copolymer comprising combining a vinyl or vinylidene terminated polyolefin with a linker to form a polyolefin-linker composition; combining the polyolefin-linker composition with a polyamide to form a polyamide-polyolefin copolymer. The linker can be a glycidyl-siloxane compound or a poly(arylene ether) copolymer or "modified" version thereof.

The polyamide-polyolefin copolymer can comprise compounds of the following formula:

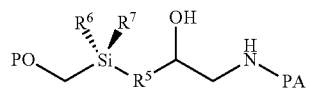

wherein the "R" groups and PO or "polyolefin" are described further herein.

The polyamide-polyolefin copolymer can also comprise compounds of the following formula, essentially, polymers based on poly(phenylene ethers) (PPE):

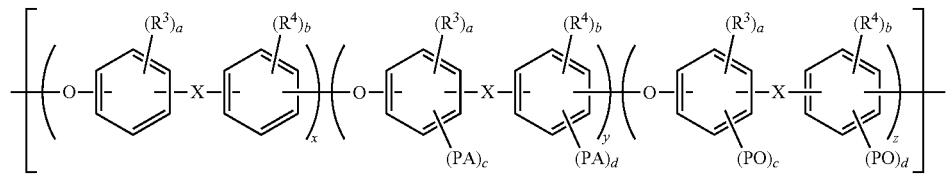

wherein the "R" groups and PO are described further herein.

DETAILED DESCRIPTION

Figure 1:
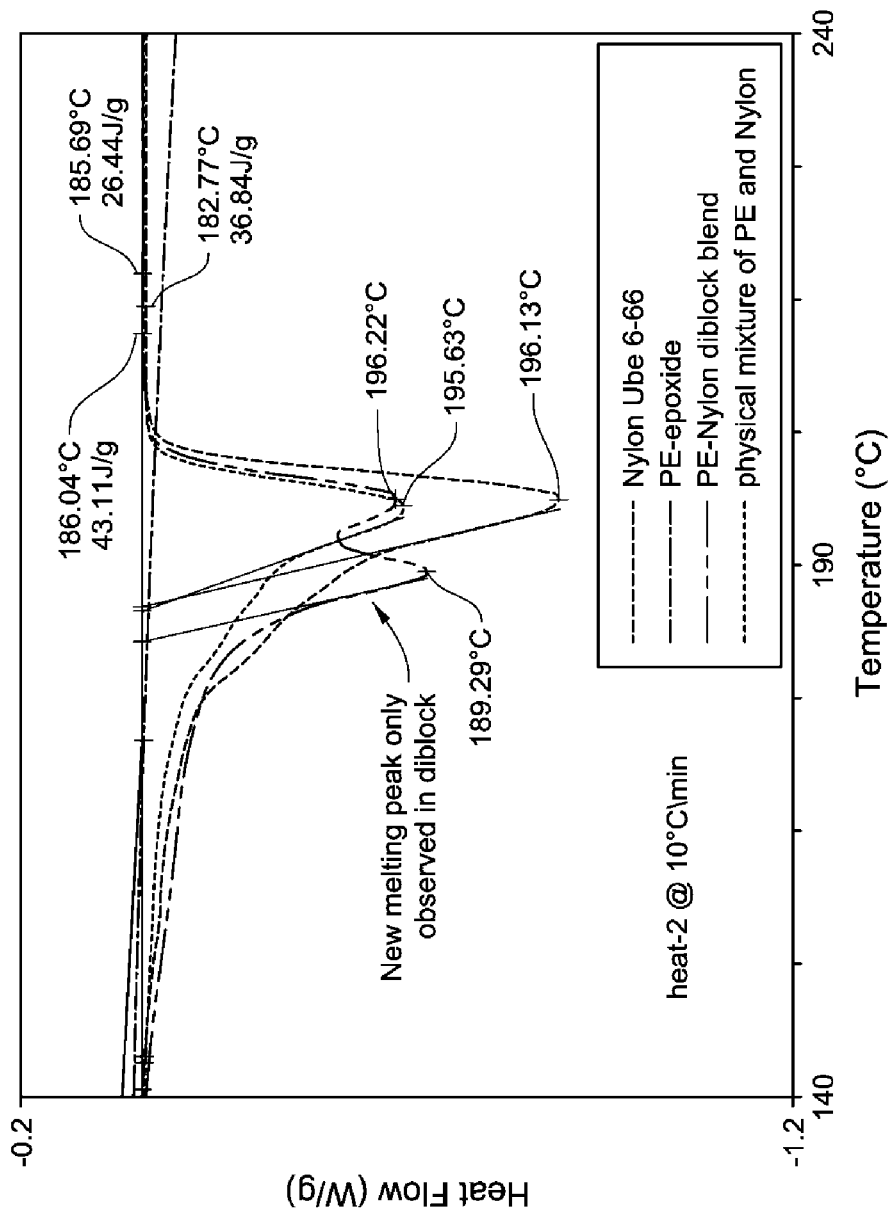
FIG. 1 is a graphical depiction of the DSC traces of the starting materials and the inventive polyamide-polyolefin copolymer reaction product in the examples.

The invention(s) described herein relate to a new process for producing polyamide-polyolefin copolymers from vinyl or vinylene-terminated polyolefins (VTPO) and polyamides (PA), and the polyamide-polyolefin copolymers themselves. The process comprises in one embodiment the modification, such as by bromination, of PPE, alkylation of PPE with vinyl-terminated polyolefins (VTPOs), and nucleophilic substitution reaction of the modified PPE with amine chain end of PAs, to form covalently linked copolymers with PO, PPE and PA segments. The reaction sequence can be altered, or multiple reactions can take place in the same step. The polymeric or oligomeric PPE provides better chance to couple both PO and PA, resulting in a triblock-like copolymer structure that can potentially give rise to better compatibilization of the three distinct components, and enhanced properties and processability. The invention also relates to another method that comprises hydrosilylation of vinyl-terminated macromers with epoxide-functionalized hydrosilanes, or direct epoxidation of the terminal unsaturation, and the subsequent epoxide-opening reaction with amine chain end of polyamides, to form covalently linked and well-defined polyolefin and polyamide block copolymers, which will contribute to better compatibilization of polyolefin and polyamide components, and enhanced properties and processability.

The inventive polyamide-polyolefin copolymer can be described as the reaction product of the VTPO, a linker ("XL") and PA. The "reaction product" between the VTPO, PA, and XL can take place in any number of sequences:

 (i)

 (ii)

or

 (iii)

 (iv)

wherein the VTPO, once having reacted with either the XL, is a polyolefin block or "PO", having the same properties (MW, Tg) as described for the VTPO below. These syntheses can be carried out sequentially in "one pot" or the reactant of each step can be purified before moving to the next step. Note that the XL is such that the VTPO preferably does not react with, or otherwise form a bond with, the polar groups along the PA polymer backbone, but only the terminal functional groups of the PA, thus, desirably forming a "block" copolymer as opposed to a "comb" type of polymer.

The XL is simply a low to moderate molecular weight bi- or multi-functional compound capable of forming covalent bonds with both the PA and the VTPO, or, alternatively, a compound capable of forming a reactive terminal group with either the VTPO or PA block such that the reactive-terminal group bound thereto can then react with the other polymer block. Suitable examples of the former are compounds such as poly(phenylene ether) copolymers (preferably with a suitable acid), 1,1,3,3-tetramethyldisiloxane and (3-glycidoxypropyl)-1,1,3,3-tetramethyldisiloxane (preferably with the suitable metal catalyst).

Thus, the XL can react individually with the VTPO, PA, or both at the same time. The reactant PO—XL preferably has one selected from the general formula (I):

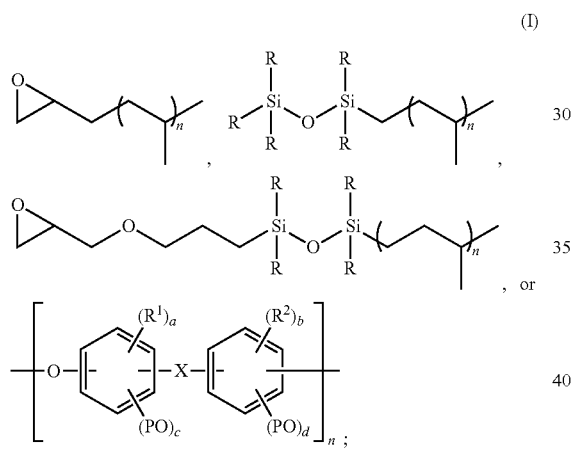

(I)

wherein each "R" group is independently selected from $C_1$ to $C_{10}$ alkyls, and wherein the value of "n" is preferably within the range of from 50 to 1000; and wherein $R^1$ and $R^2$ groups are independently selected from hydrogen, aryl, substituted aryl, $C_1$ to $C_{10}$ alkyl groups, hydroxyl, halogen, or $C_1$ to $C_{10}$ alkoxy; a and b are independently 0, 1, 2, 3, or 4, and (a+b) is less than 8; X is, independently, an oxygen, sulfur, nitrogen, phosphorus, silicon, or carbon containing moiety; and n is any value from 1 to 200.

A general and representative reaction scheme for one embodiment of the invention using a glycidyl-siloxane compound as the linker is shown below (II):

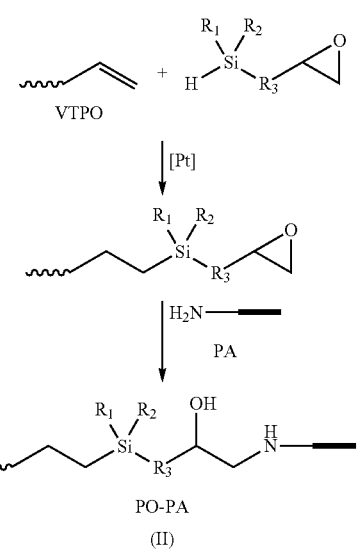

(II)

wherein the $R^1$ and $R^2$ groups are independently selected from $C_1$ to $C_{10}$ alkyl or alkoxy groups.

A general and representative reaction scheme of another embodiment of the invention using poly(arylene ether) copolymer as the linker is shown below (III):

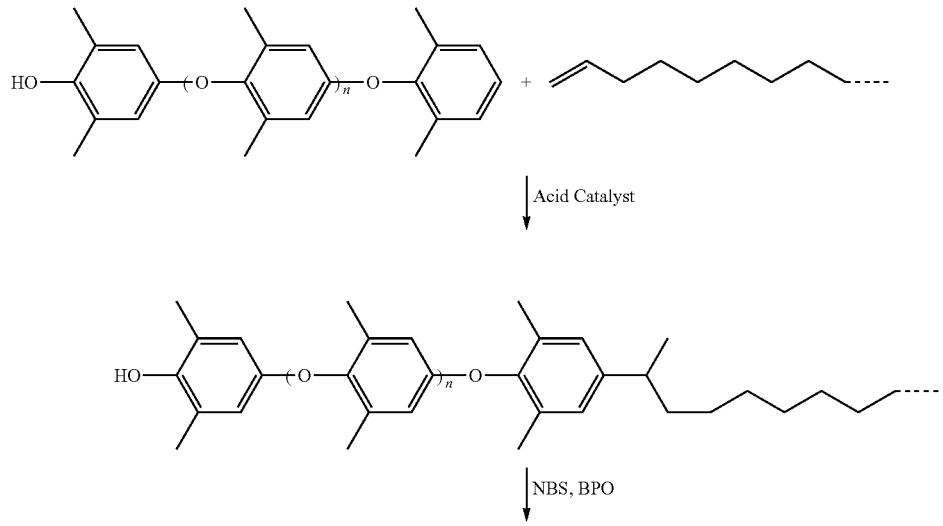

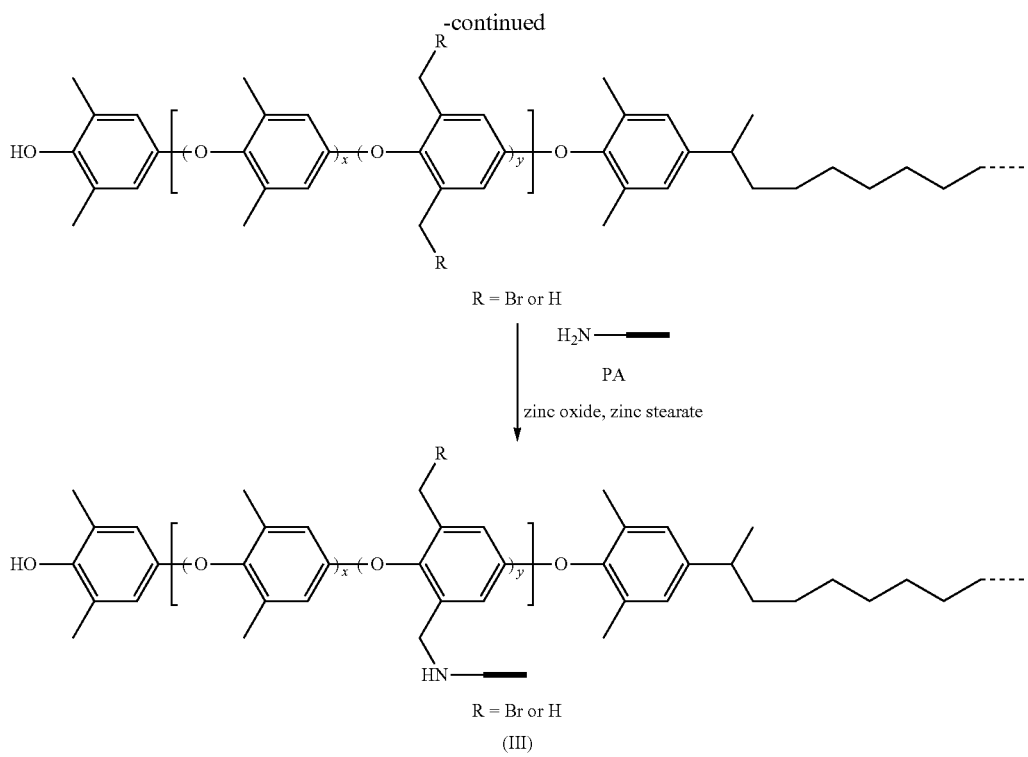

(III)

The Vinyl or Vinylidene Terminated Polyolefin

The vinyl or vinylidene terminated polyolefins useful in the inventive polyamide-polyolefin copolymers can be made in any number of ways, and is most desirably a vinyl terminated polyolefin, but may include some vinylidene terminal groups ("VTPO"). Preferably, the VTPO's useful herein are polymers as first described in US 2009-0318644 (referred to therein as vinyl terminated "macromers" or "macromonomers") having at least one terminus ($CH_2CH$—$CH_2$-oligomer or polymer) represented by formula (IV):

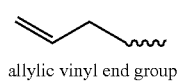

allylic vinyl end group (IV)

where the "∿∿" represents the oligomer or polymer chain. Preferably, the allyl chain ends are represented by the formula (V):

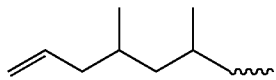

(V)

The amount of allyl chain ends is determined using $H^1$ NMR at 120° C. using deuterated 1,1,2,2-tetrachloroethane as the solvent on a 500 MHz machine, and in selected cases confirmed by $^{13}C$ NMR. These groups (IV) and (V) will react to form a chemical bond with a metal, as mentioned above, to form the M-$CH_2CH_2$-polymer. In any case, Resconi has reported proton and carbon assignments (neat perdeuterated 1,1,2,2-tetrachloroethane used for proton spectra, while a 50:50 mixture of normal and perdeuterated 1,1,2,2-tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114 J. Am. Chem. Soc. 1025-1032 (1992) that are useful herein.

The vinyl-terminated propylene-based polymers may also contain an isobutyl chain end. "Isobutyl chain end" is defined to be an oligomer having at least one terminus represented by the formula (VI):

(VI)

Preferably, the isobutyl chain end is represented by one of the following formulae (VII):

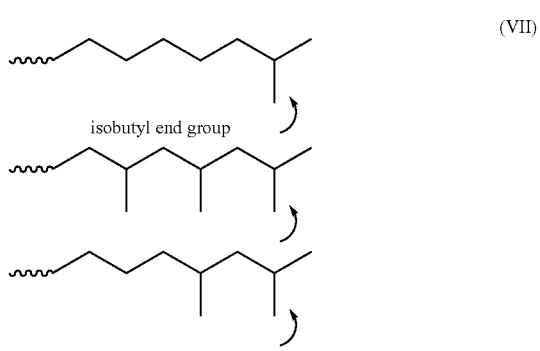

isobutyl end group (VII)

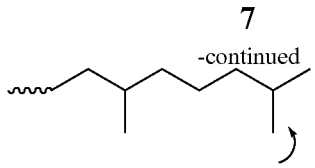
-continued

The percentage of isobutyl end groups is determined using $^{13}$C NMR (as described in the example section) and the chemical shift assignments in Resconi for 100% propylene oligomers. Preferably, the vinyl-terminated polymers described herein have an allylic terminus, and at the opposite end of the polymer an isobutyl terminus.

The VTPOs can be made by any suitable means, but most preferably, the VTPOs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 Å$^3$) perfluorinated boron activator, for example, as described in US 2012-0245299.

The vinyl terminated polyolefin can be any polyolefin having a vinyl-terminal group, as described above, any of which may have a number average molecular weight ($M_n$) of at least 300 g/mole. Preferably, greater than 90 or 94 or 96 wt % of the polyolefin comprises terminal vinyl groups; or within the range of from 50 or 60 wt % to 70 or 80 or 90 or 95 or 98 or 99 wt %. As described above, the vinyl terminated polyolefins preferably have a Mn value of at least 200 or 400 or 1000 or 5000 or 20,000 g/mole, or within the range of from 5,000 or 10,000 or 20,000 or 30,000 g/mole to 50,000 or 80,000 or 100,000 or 120,000 or 160,000 g/mole. The vinyl terminated polyolefins preferably have a weight average molecular weight ($M_w$) value of at least 500 or 800 or 1000 or 5000 or 20,000 g/mole, or within the range of from 500 or 800 or 1000 or 2000 g/mole to 6,000 or 10,000 or 12,000 or 20,000 or 30,000 or 40,000 or 50,000 or 100,000 or 200,000 or 300,000 g/mole. Preferably, the VTPO useful herein is amorphous polypropylene, and desirably has a glass transition temperature ($T_g$) of less than 10 or 5 or 0° C., more preferably, less than −10° C.; or within the range of from 0 or −5 or −10° C. to −30 or −40 or −50° C. or as described herein. The VTPOs are preferably linear, meaning that there is no polymeric or oligomeric branching from the polymer backbone, or described quantitatively, having a branching index "g" (or $g'_{vis\ avg}$) of at least 0.90 or 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in US 2013-0090433.

A particularly preferred VTPO is one wherein the vinyl terminated polyolefin is a compound or mixture of compounds represented by the formula (VIII):

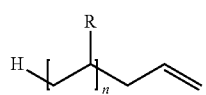

(VIII)

wherein each R is selected from hydrogen and $C_1$ to $C_4$ or $C_{10}$ alkyls; and n is an integer from 2 or 4 or 10 or 20 to 50 or 100 or 200 or 500 or 800.

Polyamide-Polyolefin Copolymer

Broadly, the inventive process can be described as a process for forming a polyamide-polyolefin copolymer comprising combining a vinyl or vinylidene terminated polyolefin with a linker to form a polyolefin-linker composition; combining the polyolefin-linker composition with a polyamide to form a polyamide-polyolefin copolymer that still includes the reacted linker. By "combining" what is meant is that the claimed components are intimately mixed with one another under conditions to effect a chemical reaction between them such as bond formation, such as by heating and/or addition of some catalyst (e.g., an acid, metal, metal oxide, etc.).

As described above, in one embodiment, the "linker" (XL) is a glycidyl-siloxane compound, which is a hydrocarbon compound that comprises at least one glycidyl group (—$C_2H_3O$) and at least one siloxane group ($R_2Si(H)OR$—). In this embodiment, the first reaction step, reacting the VTPO and linker, is preferably effected by Pt or Pd catalysis at a temperature of from 10 to 40° C.; and the second reaction step, the PO-linker reacted with the PA, is effected by heating and/or reactive extrusion at a temperature of at least 180 or 190 or 200° C. The reaction can actually be carried out as two distinct steps, the first reaction product isolated and then reacted as in the second reaction step, or consecutively without separation of products.

In another embodiment, as described above, the linker is a poly(arylene ether) copolymer (PAE). In that embodiment, the reaction is carried out in a manner consistent with the reaction scheme (i) through (iv) above, which, more particularly, includes (a.i) combining the vinyl or vinylidene terminated polyolefin with the poly(arylene ether) to form a polyolefin-poly(arylene ether) copolymer; and (a.ii) modifying the polyolefin-poly(arylene ether) copolymer to form a modified polyolefin-poly(arylene ether); or (b.i)modifying the poly(arylene ether) to form a modified poly(arylene ether); and (b.ii) combining the modified poly(arylene ether) with a vinyl or vinylidene terminated polyolefin to form a modified polyolefin-poly(arylene ether); and finally, combining the modified polyolefin-poly(arylene ether) copolymer with a polyamide to form the polyamide-polyolefin copolymer. The polyamide-polyolefin copolymer typically includes the reacted linker bound to both the polyolefin and polyamide. This last combining step may be effected by any suitable means such as by heating to at least 180 or 190 or 200° C., and/or by reactive extrusion through mixing equipment such as a Brabender or a single or double screw extruder.

As used herein, "modification" in the second embodiment refers to a chemical transformation of the poly(arylene ether) that exchanges a hydrogen on the benzylic position for a functional group that will act as a "leaving group", or group that in a subsequent chemical transformation can be displaced from the benzylic carbon to which it is bound, typically taking the electron pair with it, such as by nucleophilic substitution and other mechanisms known in the art. Preferably, the "modification" comprises halogenation, where a benzylic hydrogen is replaced with a halogen, where the halogen or "leaving group" is selected from chlorine, bromine, and iodine. An example of such a modifying agent is N-bromosuccinamide, or a metal catalyst with the $Cl_2$ or $Br_2$ compound, or alternatively HCl or HBr alone or with a metal catalyst. The modifying agent is reacted with the poly(arylene ether) to effect the exchange of an aryl hydrogen for a halogen or other leaving group. This modification of the polyolefin-poly(arylene ether) copolymer may be further effected by combining with an organic peroxide such as benzoyl peroxide and the halogenation agent.

In any case, the "acid" is a Group 4 to 13 Lewis acid or an organic ($C_1$ to $C_{20}$) carboxylic or sulfonic acid. Categories of useful Lewis acids include those such as (1) most all cations, such as $Al^{3+}$, $Cu^{2+}$, $Fe^{2+}$, $Fe^{3+}$, $Ti^{2+}$, $Sn^{2+}$, etc.; (2) any substance with an incomplete octet of electrons, such as $BF_3$, $AlF_3$, $AlCl_3$, etc.; (3) any substance with central atom having more than 8 valence shell electrons, such as $SiBr_4$, $SiF_4$, etc.; and (4) any substance having multiple bonds between two atoms of different electronegativities, such as $CO_2$, $SO_2$, etc. Also, a metal oxide catalyst or other Lewis acid is preferably present when the modified polyolefin-poly(arylene ether) copolymer is reacted with the polyamide.

The "polyamide" can be any desirable compound with repeating units linked by amide bonds, most preferably a compound having a molecular weight of at least 200 or 400 g/mole that is the condensation reaction product of an amino group on the compound and a carboxylic acid or acid halide on another similar compound. Preferably, the polyamide has a number average molecular weight (Mn) within a range of from 400 or 800 or 1200 or 2000 or 5000 or 10,000 g/mole to 30,000 or 40,000 or 50,000 or 60,000 g/mole. Polyamides are well known in the art, some examples including so called "PA 6" $[NH-(CH_2)_5-CO]_n$ made from ε-Caprolactam; "PA 66" $[NH-(CH_2)_6-NH-CO-(CH_2)_4-CO]_n$ made from hexamethylenediamine and adipic acid; and copolymers such as "PA 6/66" $[NH-(CH_2)_6-NH-CO-(CH_2)_4-CO]_n-[NH-(CH_2)_5-CO]_m$ made from caprolactam, hexamethylenediamine and adipic acid; and "PA 66/610" $[NH-(CH_2)_6-NH-CO-(CH_2)_4-CO]_n-[NH-(CH_2)_6-NH-CO-(CH_2)_8-CO]_m$ made from hexamethylenediamine, adipic acid and sebacic acid.

Preferably, the poly(arylene ether) has a number average molecular weight (Mn) within the range of from 200 or 400 or 1000 or 5000 g/mole to 20,000 or 30,000 or 40,000 g/mole. The compound can be described with reference to the following formula (IX):

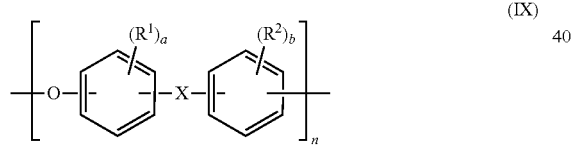

wherein $R^1$ and $R^2$ groups are independently selected from hydrogen, aryl, substituted aryl, $C_1$ to $C_{10}$ alkyl groups, hydroxyl, halogen, or $C_1$ to $C_{10}$ alkoxy; where the "aryl" is a $C_6$ to $C_{20}$ aryl, alkylaryl, or multi-ring aryl compound, most preferably phenyl;

a and b are independently 0, 1, 2, 3, or 4, and (a+b) is less than 8;

X is, independently, an oxygen, sulfur, nitrogen, phosphorus, silicon, or carbon containing moiety; and n is any value from 1 to 200.

In the inventive process, the vinyl or vinylidene-terminated polyolefin can be any compound as described above, but preferably is selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof. Preferably, the vinyl or vinylidene-terminated polyolefin has a number average molecular weight within a range of from 5,000 or 10,000 or 20,000 or 30,000 g/mole to 50,000 or 80,000 or 100,000 or 120,000 or 160,000 g/mole.

The reaction product in any embodiment is a polyamide-polyolefin copolymer with the residual (or reacted) linker group chemically bonded to both the polyamide and polyolefin, most preferably once. In one embodiment, the polyamide-polyolefin copolymer comprises compounds of the following formula (X):

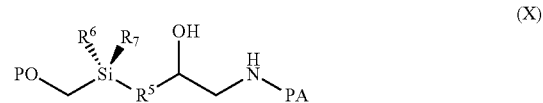

wherein $R^5$ is a $C_1$ to $C_{10}$ alkenyl group or divalent aromatic group;

each of $R^6$ and $R^7$ are independently hydrogen, $C_1$ to $C_{10}$ alkyls, or $C_1$ to $C_{10}$ alkoxys;

PA is a $C_6$ to $C_{50}$ polyamide; and

PO is a polyolefin. The polyolefin is the residual portion of any corresponding VTPO described above, and is preferably selected from the group consisting of polyethylene, polypropylene, ethylene-propylene copolymer, hexene-ethylene copolymer, octene-ethylene copolymer, and combinations thereof.

In another embodiment, the inventive polyamide-polyolefin copolymer comprises compounds of the following (XI):

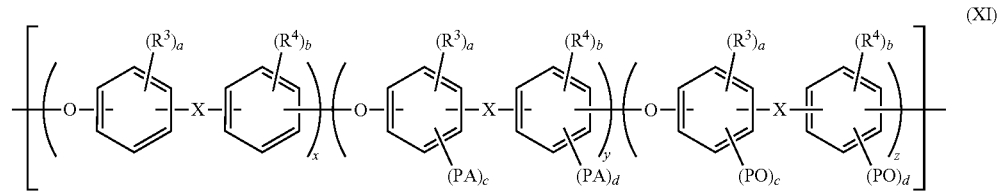

wherein $R^3$ and $R^4$ groups are independently selected from hydrogen, aryl, substituted aryl, $C_1$ to $C_{10}$ alkyl groups, hydroxyl, halogen, or $C_1$ to $C_{10}$ alkoxy;

a and b are independently 0, 1, 2, 3, or 4, and (a+b) is less than 8;

c and d are independently 0, 1, 2, 3, or 4, and (c+d) is at least 1;

x is any number from 0 to 198, y and z are at least 1 (or within a range from 1 to 199);

X is, independently, an oxygen, sulfur, nitrogen, silicon, phosphorus, or carbon containing moiety;

PA is a $C_6$ to $C_{50}$ polyamide; and

PO is a polyolefin. The polyolefin is the residual portion of any corresponding VTPO described above, and is preferably selected from the group consisting of polyethylene, polypropylene, ethylene-propylene copolymer, hexene-ethylene copolymer, octene-ethylene copolymer, and combinations thereof.

In any case, the polyamide-polyolefin copolymer is useful for any number of end-use articles, especially those that require high Modulus and impact strength. A primary use for such copolymers is in automotive components.

The various descriptive elements and numerical ranges disclosed herein for the inventive methods and polyamide-polyolefin compositions can be combined with other descriptive elements and numerical ranges to describe the invention(s); further, for a given element, any upper numerical limit can be combined with any lower numerical limit described herein, including the examples. The features of the invention are demonstrated in the following non-limiting examples.

EXAMPLES

Test Methods

Complex Viscosity: Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting a compression-molded sample of resin onto the parallel plates. To determine the samples viscoelastic behavior, frequency sweeps in the range from 0.01 to 385 rad/s were carried out at 190° C. under constant strain. Depending on the molecular weight and temperature, strains of 10% and 15% were used and linearity of the response was verified. A nitrogen stream was circulated through the sample oven to minimize chain extension or cross-linking during the experiments. A sinusoidal shear strain is applied to the material. If the strain amplitude is sufficiently small the material behaves linearly. It can be shown that the resulting steady-state stress will also oscillate sinusoidally at the same frequency but will be shifted by a phase angle δ (delta) with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials, 0<δ<90. The shear thinning slope (STS) was measured using plots of the logarithm (base ten) of the dynamic viscosity versus logarithm (base ten) of the frequency. The slope is the difference in the log(dynamic viscosity) at a frequency of 100 $s^{-1}$ and the log(dynamic viscosity) at a frequency of 0.01 $s^{-1}$ divided by 4.

The complex shear viscosity (eta, or η*) versus frequency (omega, or ω) curves were fitted using the Cross model (see, for example, C. W. Macosco, RHEOLOGY: PRINCIPLES, MEASUREMENTS, AND APPLICATIONS, Wiley-VCH, 1994):

$$\eta^* = \frac{\eta_0}{1 + (\lambda\omega)^{1-n}}.$$

The three parameters in this model are: $r_{10}$ is the zero-shear viscosity; λ (lambda), the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1−n on a log(η*)–log(ω) plot. For Newtonian fluids, n=1 and the dynamic complex viscosity is independent of frequency. For the polymers of interest here, n<1, so that enhanced shear-thinning behavior is indicated by a decrease in n (increase in 1−n).

GPC: Polymer molecular weight (weight-average molecular weight, $M_w$, number-average molecular weight, $M_n$, and z-averaged molecular weight, $M_z$) and molecular weight distribution ($M_w/M_n$) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer. Three Polymer Laboratories PLgel 10 mm Mixed-B columns are used. The nominal flow rate is 0.5 $cm^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC.

Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration can range from 1.0 to 2.0 mg/ml, with lower concentrations being used for higher molecular weight samples.

Prior to running each sample, the DRI detector and the injector are purged. Flow rate in the apparatus is then increased to 0.5 ml/minute, and the DRI allowed to stabilize for 8 to 9 hours before injecting the first sample. The LS laser is turned on 1 to 1.5 hours before running samples.

Example 1

Hydrosilylation of VTPO

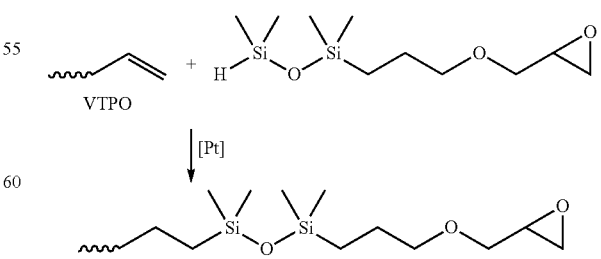

Under nitrogen protection, 3.0 g of vinyl-terminated polyethylene (having a number average molecular weight of 10,100 g/mole) was dissolved in 60 mL anhydrous toluene at refluxing temperature. The solution was added 0.738 g of 3-glycidoxypropyl-1,1,3,3-tetramethyldisiloxane (Gelest, CAS #: 17980-29-9) and 0.0647 mL of Karstedt catalyst (Aldrich). The reaction mixture was allowed to proceed at refluxing toluene overnight. The reaction mixture was then cooled down to room temperature and precipitated to a large quantity of isopropanol. The precipitated solid was recovered by filtration as a white powder. The product was dried in a 60° C. vacuum oven until constant weight, to yield 2.25 g (75%). The product PE-epoxide was characterized by $^1$H NMR, which showed disappearance of vinyl protons and appearance of epoxide protons, in comparison to the $^1$H NMR spectrum of the starting material vinyl-terminated polyethylene.

Several PE-epoxide samples with different PE molecular weights (20K, 43K, and 85K) were synthesized by the same manner Reactive Extrusion of PE-epoxide and Polyamide

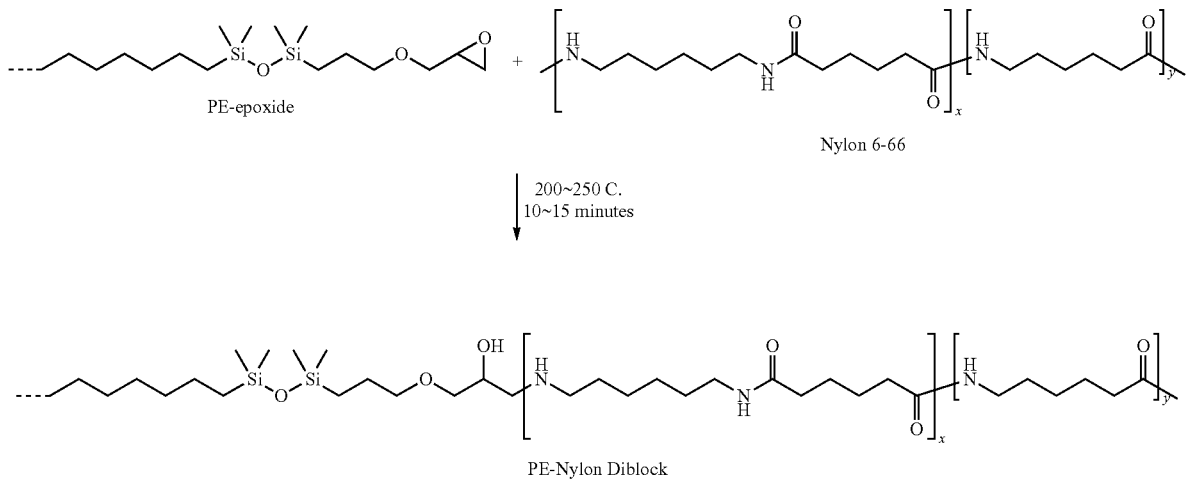

Nylon (Ube 6-66, 2.625 g), PE-epoxide (0.875 g), MgBr$_2$-Et$_2$O (Aldrich, CAS #: 29858-07-9, 0.006 g) and stabilizer powders (50 wt % Irganox 1076 and 50 wt % Irgafos 168, 0.004 g) were ground and mixed in a mortar. The blend was fed into a DSM mini extruder at 216-220° C. and mixed inside the extruder with 50 RPM for 5 minutes.

The insoluble product was characterized by differential scanning calorimetry (DSC) as shown in FIG. 1. In both heating and cooling traces, the PE-nylon block copolymer sample showed new thermal transitions that didn't exist in PE, nylon, or a physical mixture of PE and nylon at the same weight ratio, implying the formation of a new species consistent with a polyamide-polyolefin copolymer.

Example 2

Synthesis of PPE-g-PE

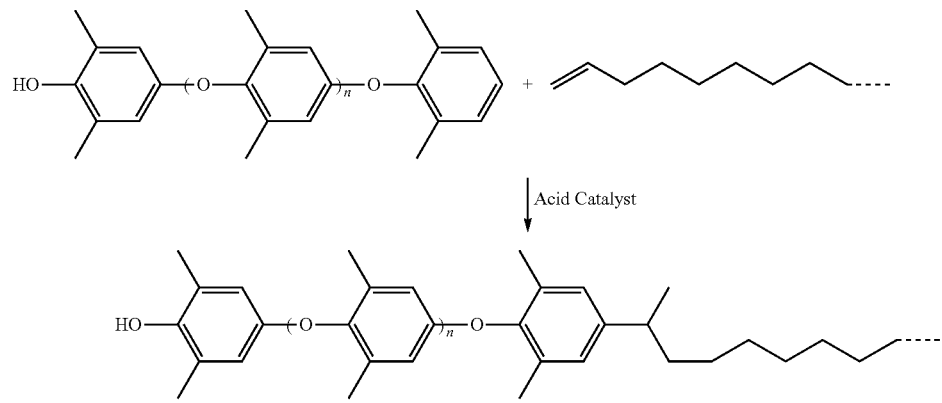

Under nitrogen protection, 30 g of PPE (Aldrich, CAS #: 25134-01-4) and 30 g of vinyl-terminated polyethylene (Paxon™ HDPE) were fully dissolved in 500 mL anhydrous ortho-dichlorobenzene (o-DCB) at 120° C., followed by addition of 0.8 g of AlCl$_3$ (Aldrich, CAS #: 7446-70-7). The reaction was allowed to proceed for 4 hours and then precipitated to 3 L of methanol. The precipitated powder was filtered and the solid was suspended and vigorously stirred in 3.5 L of dichloromethane for 2 hours to remove the unreacted PPE. The solid was filtered and then dried in a 60° C. vacuum oven till constant weight, to yield 56 g white powder (93%).

Bromination of PPE-g-PE

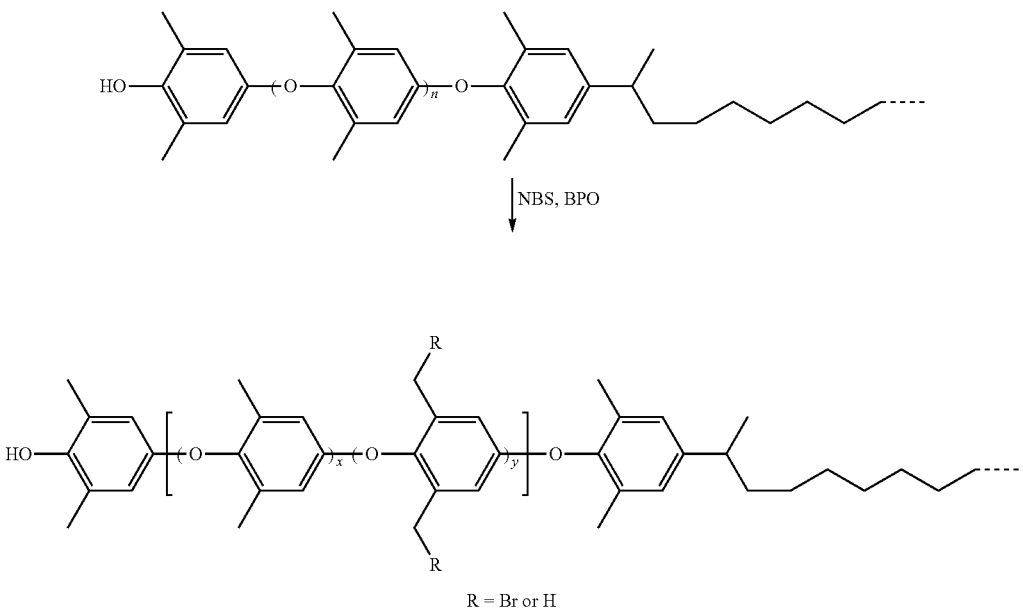

R = Br or H

Under nitrogen protection, 2 g of PPE-g-PE was dissolved in 80 mL of 1,1,2,2-tetrachloroethane (TCE) at 100° C. After the polymer completely dissolved, 0.356 g of N-bromosuccinimide (NBS, Aldrich, CAS #: 128-08-5) and 0.024 g of benzoyl peroxide (BPO, Aldrich, CAS #: 94-36-0) were added. The reaction was held at 100° C. for 2.5 h. Upon cooling to room temperature, the reaction mixture was poured into 500 mL of methanol. The precipitated solid was collected by filtration, dried, and further Soxhlet extracted with acetone for 24 h, and dried in a 60° C. vacuum oven till constant weight, to yield 1.95 g product Br-PPE-g-PE (83%). The product was characterized by $^1$H NMR and differential scanning calorimetry (DSC).

Reactive Extrusion of Br-PPE-g-PE and Polyamide

Polyamide (Ube 6-66, 1.5 g), Br-PPE-g-PE (1.5 g), zinc oxide (Aldrich, CAS #: 1314-13-2, 0.005 g), zinc stearate (Aldrich, CAS #: 557-05-1, 0.009 g), and stabilizer powders (50 wt % Irganox 1076 and 50 wt % Irgafos 168, 0.003 g) were ground and mixed in a mortar. The blend was fed into a DSM mini extruder at 216-220° C. and mixed inside the extruder with 50 RPM for 5 minutes.

Figure 2:
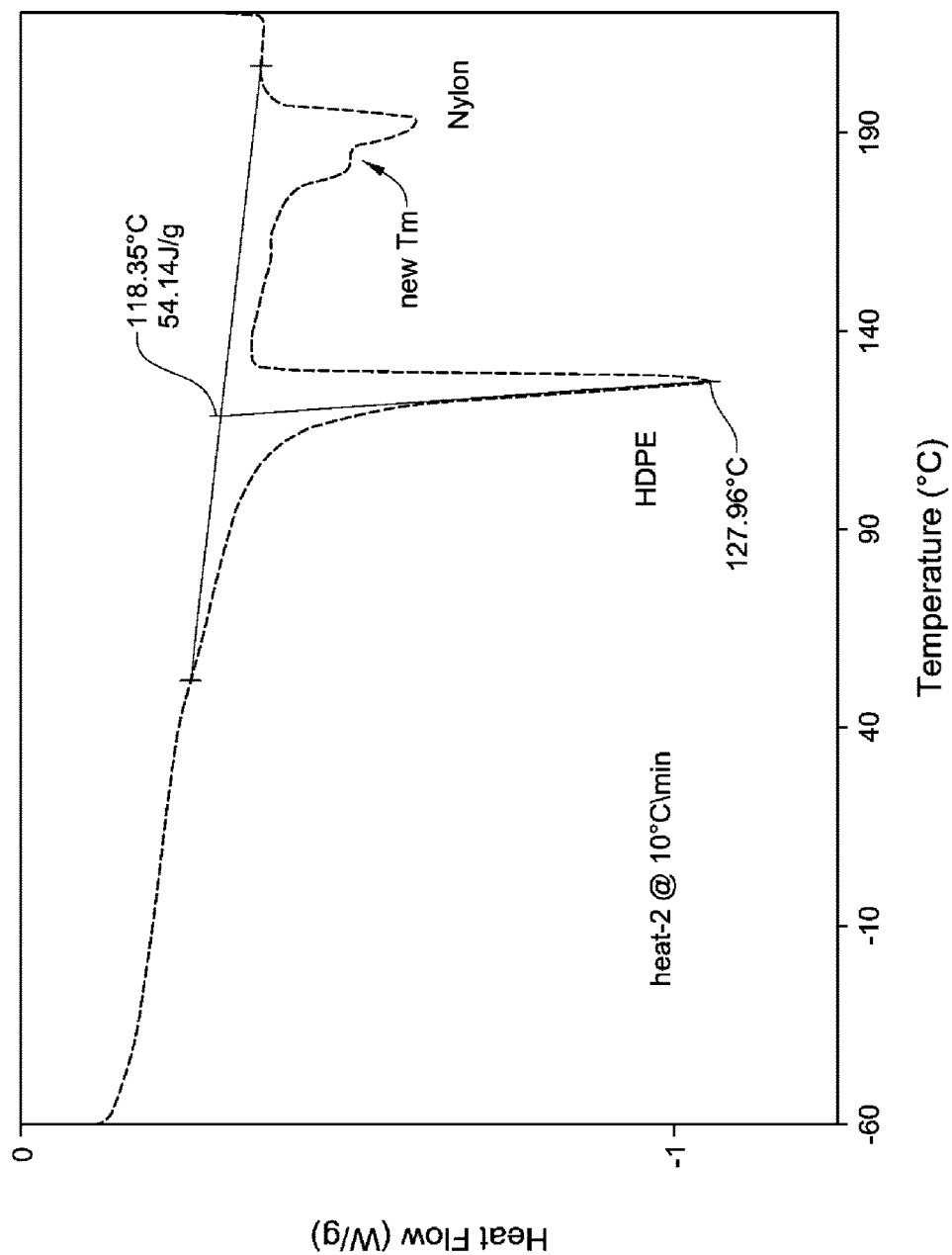
FIG. 2 is a DSC trace of the polyamide-polyolefin copolymer reaction product from the examples.

The insoluble product was characterized by DSC as shown in FIG. 2. The extruded product showed a new melting temperature peak that didn't exist in PE, polyamide, or a physical mixture of the PE and polyamide, implying the formation of a new species consistent with a polyamide-polyolefin copolymer.

Having described the various features of the inventive polyamide-polyolefin copolymer, and methods of forming the copolymer, described here in numbered paragraphs is:

P1. A process for forming a polyamide-polyolefin copolymer comprising:
  combining a vinyl or vinylidene terminated polyolefin with a linker to form a polyolefin-linker composition;
  combining the polyolefin-linker composition with a polyamide to form a polyamide-polyolefin copolymer.
P2. The process of numbered paragraph 1, wherein the linker is a glycidyl-siloxane compound.
P3. The process of numbered paragraph 2, wherein the first step is effected by Pt or Pd catalysis at a temperature of from 10 to 40° C.; and the second step is effected by heating and/or reactive extrusion at a temperature of at least 180° C.
P4. The process of numbered paragraph 1, wherein the linker is a poly(arylene ether) copolymer.
P5. The process of numbered paragraph 4, comprising:
  (a.i) combining the vinyl or vinylidene terminated polyolefin with the poly(arylene ether) to form a polyolefin-poly(arylene ether) copolymer; and
  (a.ii) modifying the polyolefin-poly(arylene ether) copolymer to form a modified polyolefin-poly(arylene ether); or
  (b.i) modifying the poly(arylene ether) to form a modified poly(arylene ether); and
  (b.ii) combining the modified poly(arylene ether) with a vinyl or vinylidene terminated polyolefin to form a modified polyolefin-poly(arylene ether); and
  combining the modified polyolefin-poly(arylene ether) copolymer with a polyamide to form the polyamide-polyolefin copolymer.
P6. The process of numbered paragraph 5, wherein the modification comprises halogenation, where an arylene hydrogen is exchanged for a leaving group selected from chlorine, bromine, and iodine.
P7. The process of any one of numbered paragraphs 5-6, wherein the polyolefin-poly(arylene ether) copolymer is modified by combining with an organic peroxide and a halogenation agent.

P8. The process of any one of numbered paragraphs 5-7, wherein a Brønsted or Lewis acid is also combined with the poly(arylene ether) or modified poly(arylene ether) and vinyl or vinylidene terminated polyolefin; and wherein the acid is preferably a Groups 4 to 13 Lewis acid or an organic ($C_1$ to $C_{20}$) carboxylic or sulfonic acid.

P9. The process of any one of numbered paragraphs 5-8, wherein a metal oxide catalyst is present when the modified polyolefin-poly(arylene ether) copolymer is reacted with the polyamide.

P10. The process of any one of the previous numbered paragraphs, wherein the polyamide has a number average molecular weight (Mn) within a range of from 400 or 800 or 1200 or 2000 or 5000 or 10,000 g/mole to 30,000 or 40,000 or 50,000 or 60,000 g/mole.

P11. The process of any one of numbered paragraphs 4-10, wherein the poly(arylene ether) is a compound comprising compounds from the following:

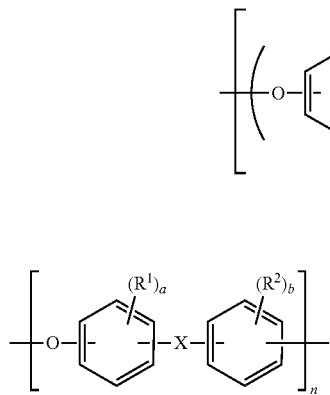

wherein $R^1$ and $R^2$ groups are independently selected from hydrogen, aryl, substituted aryl, $C_1$ to $C_{10}$ alkyl groups, hydroxyl, halogen, or $C_1$ to $C_{10}$ alkoxy;
a and b are independently 0, 1, 2, 3, or 4, and (a+b) is less than 8;
X is, independently, an oxygen, sulfur, nitrogen, phosphorus, silicon, or carbon containing moiety; and
n is any value from 1 to 200.

P12. The process of any one of numbered paragraphs 4-11, wherein the poly(arylene ether) has a number average molecular weight (Mn) within the range of from 200 or 400 or 1000 or 5000 g/mole to 20,000 or 30,000 or 40,000 g/mole.

P13. The process of any one of the previous numbered paragraphs, wherein the vinyl or vinylidene-terminated polyolefin is selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof.

P14. The process of any one of the previous numbered paragraphs, wherein the vinyl or vinylidene-terminated polyolefin has a number average molecular weight within a range of from 5,000 or 10,000 or 20,000 or 30,000 g/mole to 50,000 or 80,000 or 100,000 or 120,000 or 160,000 g/mole.

P15. A polyamide-polyolefin copolymer of any one of numbered paragraphs 1-3 comprising compounds of the following:

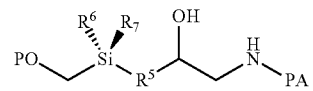

wherein $R^5$ is a $C_1$ to $C_{10}$ alkenyl group or divalent aromatic group;
each of $R^6$ and $R^7$ are independently hydrogen or $C_1$ to $C_{10}$ alkyls, or $C_1$ to $C_{10}$ alkoxys;
PA is a $C_6$ to $C_{50}$ polyamide; and
PO is a polyolefin.

P16. A polyamide-polyolefin copolymer of any one of numbered paragraphs 4-13, comprising compounds of the following:

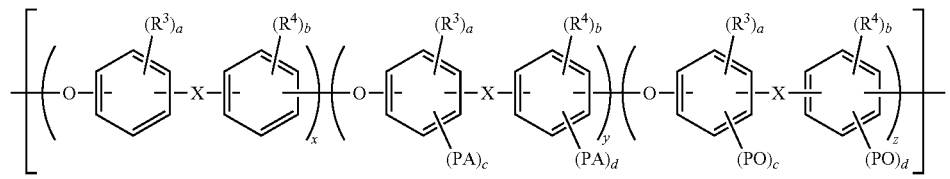

wherein $R^3$ and $R^4$ groups are independently selected from hydrogen, aryl, substituted aryl, $C_1$ to $C_{10}$ alkyl groups, hydroxyl, halogen, or $C_1$ to $C_{10}$ alkoxy;
a and b are independently 0, 1, 2, 3, or 4, and (a+b) is less than 8;
c and d are independently 0, 1, 2, 3, or 4, and (c+d) is at least 1;
x is any number from 0 to 198, y and z are at least 1 (or within a range from 1 to 199);
X is, independently, an oxygen, sulfur, nitrogen, silicon, phosphorus, or carbon containing moiety;
PA is a $C_6$ to $C_{50}$ polyamide; and
PO is a polyolefin.

P17. An automotive component comprising the polyamide-polyolefin copolymer of numbered embodiments 15 or 16.

Also disclosed is the use of a vinyl or vinylidene terminated polyolefin to make a polyamide-polyolefin copolymer as described herein. Also disclosed is the use of a polyamide-polyolefin copolymer in an automotive component as described herein. Also disclosed is the use of a poly(arylene ether) copolymer as a linker group between a polyamide and a polyolefin as described herein.

For all jurisdictions in which the doctrine of "incorporation by reference" applies, all of the test methods, patent publications, patents and reference articles are hereby incorporated by reference either in their entirety or for the relevant portion for which they are referenced, including the priority document(s).

The invention claimed is:
1. A process for forming a polyamide-polyolefin copolymer comprising:
combining a vinyl or vinylidene terminated polyolefin with a linker to form a polyolefin-linker composition; and
combining the polyolefin-linker composition with a polyamide to form a polyamide-polyolefin copolymer.

2. The process of claim 1, wherein the linker is a glycidylsiloxane compound.

3. The process of claim 2, wherein the combining step of a vinyl or vinylidene terminated polyolefin with a linker is effected by Pt or Pd catalysis at a temperature of from 10 to 40° C.; and the combining step of the polyolefin-linker composition with a polyamide is effected by heating and/or reactive extrusion at a temperature of at least 180° C.

4. The process of claim 1, wherein the linker is a poly(arylene ether).

5. The process of claim 4, comprising:
(a.i) combining the vinyl or vinylidene terminated polyolefin with the poly(arylene ether) to form a polyolefin-poly(arylene ether) copolymer; and
(a.ii) modifying the polyolefin-poly(arylene ether) copolymer to form a modified polyolefin-poly(arylene ether); or
(b.i) modifying the poly(arylene ether) to form a modified poly(arylene ether); and
(b.ii) combining the modified poly(arylene ether) with a vinyl or vinylidene terminated polyolefin to form a modified polyolefin-poly(arylene ether); and
combining the modified polyolefin-poly(arylene ether) copolymer with a polyamide to form the polyamide-polyolefin copolymer.

6. The process of claim 5, wherein the modification comprises halogenation, where an arylene hydrogen is exchanged for a leaving group selected from chlorine, bromine, and iodine.

7. The process of claim 5, wherein the polyolefin-poly(arylene ether) copolymer is modified by combining with an organic peroxide and a halogenation agent.

8. The process of claim 5, wherein a Brønsted or Lewis acid is also combined with the poly(arylene ether) or modified poly(arylene ether) and vinyl or vinylidene terminated polyolefin.

9. The process of claim 5, wherein a metal oxide catalyst is present when the modified polyolefin-poly(arylene ether) copolymer is reacted with the polyamide.

10. The process of claim 1, wherein the polyamide has a number average molecular weight (Mn) within a range of from 400 g/mole to 60,000 g/mole.

11. The process of claim 4, wherein the poly(arylene ether) is a compound comprising compounds from the following:

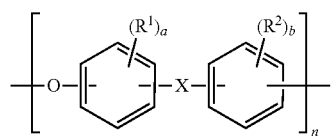

wherein $R^1$ and $R^2$ groups are independently selected from hydrogen, aryl, substituted aryl, $C_1$ to $C_{10}$ alkyl groups, hydroxyl, halogen, or $C_1$ to $C_{10}$ alkoxy;
a and b are independently 0, 1, 2, 3, or 4, and (a+b) is less than 8;
X is, independently, an oxygen, sulfur, nitrogen, phosphorus, silicon, or carbon containing moiety; and
n is any value from 1 to 200.

12. The process of claim 4, wherein the poly(arylene ether) has a number average molecular weight (Mn) within the range of from 200 g/mole to 40,000 g/mole.

13. The process of claim 1, wherein the vinyl or vinylidene-terminated polyolefin is selected from the group consisting of vinyl or vinylidene-terminated polyethylene, vinyl or vinylidene-terminated polypropylene, vinyl or vinylidene-terminated ethylene-propylene copolymer, vinyl or vinylidene-terminated hexene-ethylene copolymer, vinyl or vinylidene-terminated octene-ethylene copolymer, and combinations thereof.

14. The process of claim 1, wherein the vinyl or vinylidene-terminated polyolefin has a number average molecular weight within a range of from 5,000 g/mole to 160,000 g/mole.

15. A polyamide-polyolefin copolymer comprising compounds of the following:

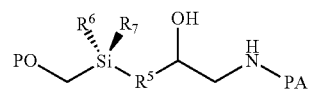

wherein $R^5$ is a $C_1$ to $C_{10}$ alkenyl group or divalent aromatic group;
each of $R^6$ and $R^7$ are independently hydrogen, $C_1$ to $C_{10}$ alkyls, or $C_1$ to $C_{10}$ alkoxys;
PA is a $C_6$ to $C_{50}$ polyamide; and
PO is a polyolefin.

16. The polyamide-polyolefin copolymer of claim 15, wherein the polyolefin selected from the group consisting of polyethylene, polypropylene, ethylene-propylene copolymer, hexene-ethylene copolymer, octene-ethylene copolymer, and combinations thereof.

17. The polyamide-polyolefin copolymer of claim 15, wherein the polyolefin has a number average molecular weight within a range of from 5,000 g/mole to 160,000 g/mole.

18. The polyamide-polyolefin copolymer of claim 15, wherein the polyamide has a number average molecular weight (Mn) within a range of from 400 g/mole to 60,000 g/mole.

19. An automotive component comprising the polyamide-polyolefin copolymer of claim 15.

* * * * *